A. S. WOODWARD.
Wagon Hub.
No. 84,601.  Patented Dec. 1, 1868.
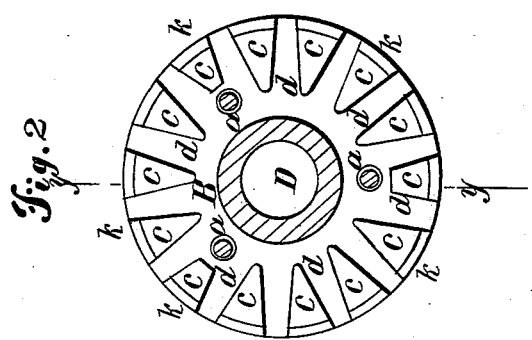
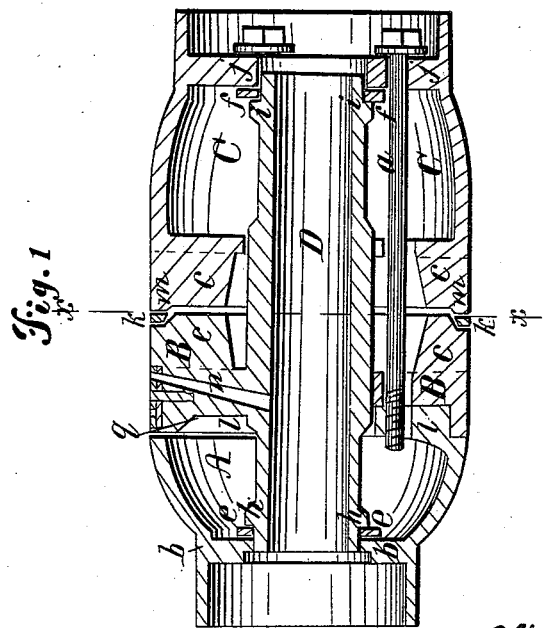

ALONSO S. WOODWARD, OF PEPPERELL, MASSACHUSETTS.

Letters Patent No. 84,601, dated December 1, 1868.

IMPROVEMENT IN WAGON-HUB.

The Schedule referred to in these Letters Patent and making part of the same.

*To all whom it may concern:*

Be it known that I, ALONSO S. WOODWARD, of Pepperell, in the county of Middlesex, and State of Massachusetts, have invented new and useful Improvements in Wagon-Hubs; and I do hereby declare that the following is a full, clear, and exact description thereof, which will enable those skilled in the art to make and use the same, reference being had to the accompanying drawings, forming part of this specification, in which—

Figure 1 is a section through the axis of the hub through the line $y\ y$.

Figure 2 is a cross-section through the line $x\ x$.

Similar letters of reference indicate corresponding parts.

The object of this invention is to furnish a light, strong, and easily-fitted hub for wagon-wheels, the same being made of cast-metal, in three parts, and held together by longitudinal bolts.

Other devices, perfecting the whole, appertain to the invention, tending to perfect the same, as will hereinafter be fully set forth.

In the drawings, A, B, and C are the three parts of the hub, and $a$ are the bolts holding the same firmly together.

The part A is the outer part, and is cast hollow, with an annular diaphragm, $b$.

The proximate faces of the parts B and C are cast with an equal number of wedge-shaped projections, $c$, as shown at fig. 2, which is a view of the face of the part B.

These wedge projections, when the parts B and C are brought together, meet and form recesses $d$ for the spokes.

The said recesses are consequently dovetailed, and the spoke being formed with a corresponding dovetail, but cannot be withdrawn from the recess.

The part C is cast hollow, as shown.

The box D is cast on the part B, and forms part of the same, extending out on each side of the said part to enter the other parts, as shown, when the hub is fitted together.

Rubber packing-rings $e$ and $f$ are compressed between the shoulders $h$ and $i$ of the box, and the annular diaphragms $b$ and $j$ of the parts, respectively.

Small slips of packing, $k$, are interposed between the upper edges of the wedges $c$, as shown, to completely close the joint, and to permit the parts B and C to be drawn up to tighten the spokes, when the same have become shrunken from use or exposure.

To facilitate the application of these rubber strips, $k$, the wedges of one of the parts, as B, are jogged in or recessed to receive the said strip, while a corresponding projecting lip, $m$, is formed on the corresponding part of the opposite wedges.

The bolts $a$ pass through holes in the annular diaphragms $j$, through holes in the part B, and screw into threaded holes in the annular diaphragm $l$ of the part A, as shown.

These bolts are formed with square heads, that they may be easily turned with a wrench, to draw the parts A, B, and C together.

When the wedges $c$ are made so acute that the recesses between them are rectangular, the spokes may be driven in the hub, but when the said wedges are more obtuse, the said recesses will be dovetailed, and the spokes, being correspondingly dovetailed, will have to be entered laterally in the recesses, when the same are drawn together.

This construction admits of either manner of inserting the spokes.

$n$ is a hole leading from the external surface of the hub to the internal surface of the box, and is for the purpose of lubricating the latter.

It is closed by a cap, $p$, having a central screw-stem, which fits in a threaded hole in the hub.

It is packed by a disk of rubber, $q$, as shown.

This cap has two small holes in its upper surface for the insertion of the points of a proper implement for screwing or unscrewing the cap.

I claim as new, and desire to secure by Letters Patent—

1. The hollow cast-metal hub, composed of the parts A, C, and B, the latter having the box cast thereon, and the whole fitted together as described, and held by bolts $a$, all as set forth.

2. The packing-rings $e$ and $f$, and packing-strips $k$, substantially as described, in combination with the hollow cast-metal hub, as above set forth.

3. The part B of the hub, provided with the inclined lubricating-hole $n$, when said hole is closed by the perforated cap $p$ and the elastic packing-disk $q$, as herein described, for the purpose specified.

Witnesses:     ALONSO S. WOODWARD.
J. S. N. HOWE,
S. W. FLETCHER.